United States Patent
Iwatani et al.

(10) Patent No.: US 11,759,880 B2
(45) Date of Patent: Sep. 19, 2023

(54) WELDING GUN AND WELDING METHOD

(71) Applicant: HONDA MOTOR CO., LTD., Tokyo (JP)

(72) Inventors: Yasushi Iwatani, Tochigi (JP); Yuichi Hirata, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 297 days.

(21) Appl. No.: 16/967,547

(22) PCT Filed: Mar. 22, 2019

(86) PCT No.: PCT/JP2019/012167
§ 371 (c)(1),
(2) Date: Aug. 5, 2020

(87) PCT Pub. No.: WO2019/188815
PCT Pub. Date: Oct. 3, 2019

(65) Prior Publication Data
US 2021/0213555 A1 Jul. 15, 2021

(30) Foreign Application Priority Data

Mar. 29, 2018 (JP) .................................. 2018-064186

(51) Int. Cl.
*B23K 11/00* (2006.01)
*B23K 11/14* (2006.01)
(Continued)

(52) U.S. Cl.
CPC ............ *B23K 11/002* (2013.01); *B23K 11/14* (2013.01); *B23K 11/314* (2013.01); *B23K 11/36* (2013.01)

(58) Field of Classification Search
CPC ..... B23K 11/002; B23K 11/14; B23K 11/314; B23K 11/317; B23K 11/31836; B23K 11/364
See application file for complete search history.

(56) References Cited

U.S. PATENT DOCUMENTS

2005/0023252 A1* 2/2005 Sakoda .................... B23K 9/20
219/98
2010/0059486 A1* 3/2010 Aoyama ................. B23P 19/06
219/79
(Continued)

FOREIGN PATENT DOCUMENTS

| CN | 105312753 A | 2/2016 |
| JP | S59-89669 | 6/1984 |

(Continued)

OTHER PUBLICATIONS

Chinese Office Action dated Jun. 2, 2021, 31 pages.
International Search Report, dated: Jun. 18, 2019, 1 page.

*Primary Examiner* — Justin C Dodson
(74) *Attorney, Agent, or Firm* — Rankin, Hill & Clark LLP

(57) ABSTRACT

A welding gun and a welding method with which it is possible to reduce, the wait time for loading a component and to decrease tact time. The welding gun is a welding gun for resistance-welding components to a workpiece successively, and comprises a first holding portion and a second holding portion for holding a component. The first holding portion and the second holding portion are each switchable to an abutment-enabling position for causing a component to abut against a workpiece, or to a loading-enabling position for loading the component. The first holding portion and the second holding portion are switchable such that when the first holding portion is in the abutment-enabling position, the second holding portion is in the loading-enabling position, (Continued)

and when the second holding portion is in the abutment-enabling position, the first holding portion is in the loading-enabling position.

10 Claims, 16 Drawing Sheets

(51) Int. Cl.
*B23K 11/36* (2006.01)
*B23K 11/31* (2006.01)

(56) References Cited

U.S. PATENT DOCUMENTS

| | | | | |
|---|---|---|---|---|
| 2010/0276400 | A1* | 11/2010 | Schneider | B23K 9/206 |
| | | | | 219/98 |
| 2016/0023294 | A1 | 1/2016 | Lee et al. | |
| 2016/0303680 | A1* | 10/2016 | Eissara | B23K 9/201 |

FOREIGN PATENT DOCUMENTS

| | | |
|---|---|---|
| JP | 63-047078 | 3/1988 |
| JP | 2001-321956 | 11/2001 |
| JP | 2014-018861 | 2/2014 |
| JP | 2015-044226 | 3/2015 |

\* cited by examiner

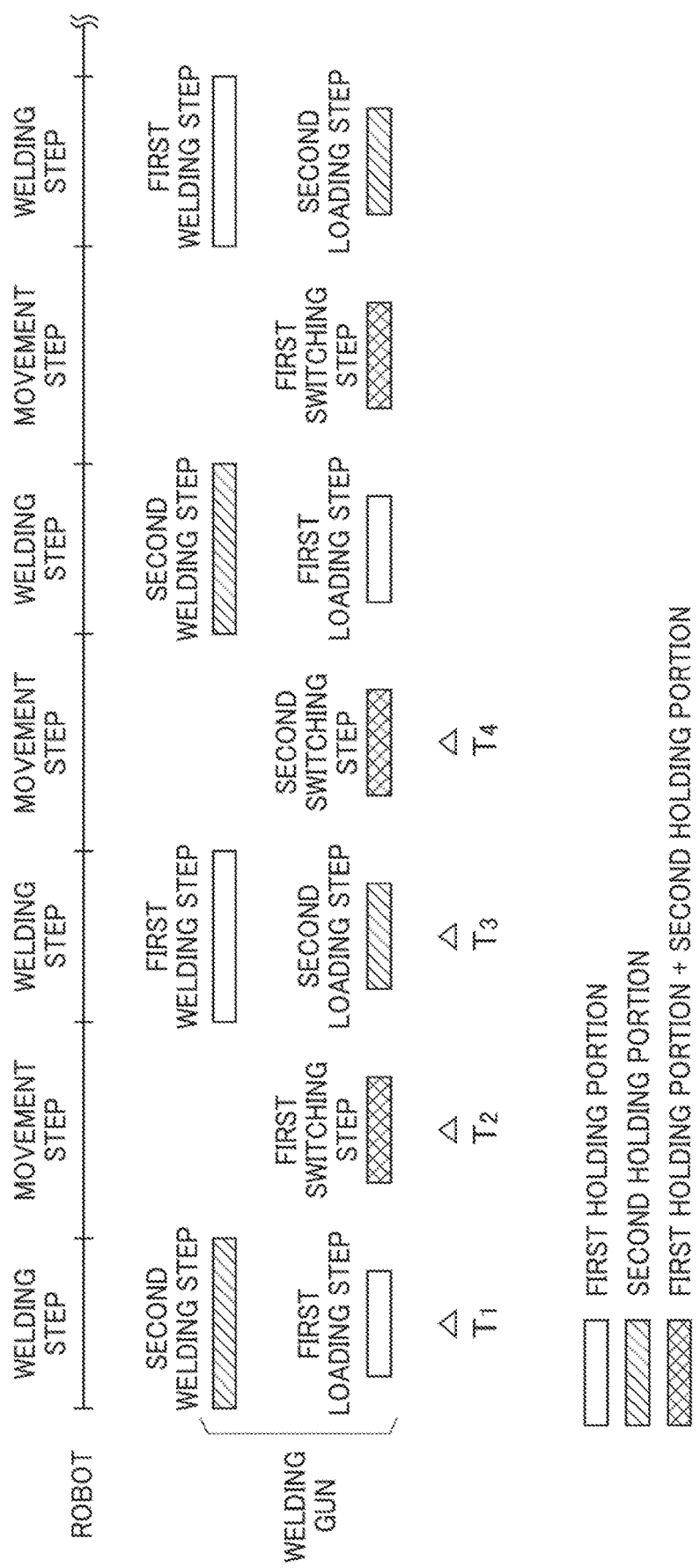

FIRST LOADING STEP                                    TIME : T1

SECOND WELDING STEP TIME : T1

FIRST SWITCHING STEP                              TIME : T2

SECOND SWITCHING STEP　　　　　　　　　　　　　　　　TIME : T2

FIRST WELDING STEP TIME : T3

SECOND LOADING STEP  TIME : T3

FIRST SWITCHING STEP
TIME : T4

SECOND SWITCHING STEP TIME : T4

WELDING GUN AND WELDING METHOD

TECHNICAL FIELD

The present invention relates to a welding gun and a welding method. In detail, it relates to a welding gun for resistance welding components to a workpiece in sequence, and a welding method using this welding gun.

BACKGROUND ART

Conventionally, resistance welding has been known as a welding method. Resistance welding is technology which performs welding by supplying electric power in a state bringing a component such as a stud bolt into contact with a workpiece, and causes localized melting due to resistance heating at the abutting part (spot) of the component.

Conventionally, with a device that resistance welds a stud bolt by bringing into contact with a workpiece, a technology has been known which sequentially welds a plurality of stud bolts by alternately performing welding of the stud bolt, and loading of a new stud bolt into a holding portion.
Patent Document 1: Japanese Unexamined Utility Model Application, Publication No. S59-89669

DISCLOSURE OF THE INVENTION

Problems to be Solved by the Invention

However, the above conventional technology cannot perform loading of a new stud bolt during welding due to alternately performing welding of a component and loading of a component, and thus cannot perform welding of a stud bolt during loading. For this reason, the above conventional technology takes time waiting for the end of the loading step, until the next welding is possible after welding a stud bolt to a workpiece, and thus has a problem in shortening of tact time.

The present invention has an object of providing a welding gun and welding method which shorten the time waiting for loading of a component, and thus capable of shortening the tact time.

Means for Solving the Problems

A welding gun according to a first aspect of the present invention is a welding gun (for example, the welding gun 1 described later) is a welding gun for resistance welding a component (for example, the component P described later) to a workpiece (for example, the workpiece W described later in sequence, the welding gun including a first holding portion (for example, the first holding portion 4A described later) and a second holding portion (for example, the second holding portion 4B described later) which hold the component, in which the first holding portion and the second holding portion are respectively switchable between an abutment-enabling position for abutting the component against the workpiece, and a loading-enabling position for receiving loading of the component, and when the first holding portion is in the abutment-enabling position, the second holding portion is in the loading-enabling position, and when the second holding portion is in the abutment-enabling position, the first holding portion is in the loading-enabling position.

According to the first aspect, by including a plurality of holding portions, since it is possible to load a component in another holding portion, while abutting against the workpiece by way of one holding portion and performing welding, the time waiting until loading completion of a component can be shortened, and thus it is possible to shorten the tact time.

According to a second aspect of the present invention, in the welding gun as described in the first aspect, it is preferable for the first holding portion and the second holding portion to both serve as conductive parts which supply electric power to the component.

According to the second aspect, since it is unnecessary to separately equip a conductive part, the configuration of the welding gun can be simplified, and a reduction in size of the welding gun becomes possible.

According to a third aspect of the present invention, in the welding gun as described in the first or second aspect, it is preferable for the welding gun to perform resistance welding of the workpiece and the component by sandwiching the workpiece by an electrode tip (for example, the electrode tip 23 described later) and the component held by the first holding portion and the second holding portion; the electrode tip to be supported by the welding gun to be capable of advancing and retracting relative to each of the first holding portion and the second holding portion, and the first holding portion and the second holding portion to be supported at a leading end (for example, the leading end 31 described later) of a fixed arm (for example, the fixed arm 3 described later) equipped to the welding gun.

According to the third aspect, the first holding portion and second holding portion are mounted to the fixed side rather than the mobile side; therefore, it is possible to reduce the weight of the mobile side upon sandwiching a workpiece by the electrode tip and component. For this reason, it is possible to suppress the actuator or the like for mobilizing to the minimum size, and as a result, it is possible to make the welding gun overall light weight and compact.

A welding method according to a fourth aspect of the present invention is a method of resistance welding a component (for example, the component P described later) to a workpiece (for example, the workpiece W described later) in sequence using a welding gun (for example, the welding gun 1 described later) including a plurality of holding portions for the component, the method including: a first loading step of loading a first component to the first holding portion (for example, the first holding portion 4A described later); a first switching step, after the first loading step, the first switching step including an operation of switching the first holding portion to a position which can abut the first component against the workpiece by way of the first holding portion, and an operation of switching the second holding portion (for example, the second holding portion 4B described later) to a position enabling loading of a second component to be welded at a subsequent spot to the second holding portion; a first welding step of, after the first switching step, causing the first component to abut the workpiece by way of the first holding portion and welding; a movement step of, after the first welding step, causing the welding gun to move to a subsequent spot position; a second loading step of loading the second component to the second holding portion; a second switching step, after the second loading step, the second switching step including an operation of switching the second holding portion to a position enabling abutting the second component against the workpiece by way of the second holding portion, and an operation of switching the first holding portion to a position enabling loading of a third component to be welded at a next subsequent spot to the first holding portion; and a second welding step of, after the second switching step, causing the second component loaded to the second holding portion in the second loading step to abut the workpiece by way of the second holding portion and welding, in which the second loading step is performed at a time overlapping the first welding step.

According to the fourth aspect, by equipping a plurality of holding portions for the component and performing welding, since the second loading step is performed at a time overlapping the first welding step, it is possible to shorten the waiting time until loading completion of a component to be welded next, and as a result, the tact time can be shortened.

According to a fifth aspect of the present invention, in the welding method as described in the fourth aspect, it is preferable for the second loading step to be performed only during the first welding step.

According to the fifth aspect, since loading of a component is not performed during the movement step, it is possible to avoid poor loading or the like due to a change in acceleration during movement, for example.

According to a sixth aspect of the present invention, in the welding method as described in the fourth or fifth aspect, it is preferable for the second switching step to be performed at a time overlapping with the movement step.

According to the sixth aspect, due to switching the positions of the holding portions during movement, it is possible to shorten the waiting time for switching, and thus the tact time can be further shortened.

According to a seventh aspect of the present invention, in the welding method as described in the sixth aspect, it is preferable for the second switching step to be performed only during the movement step.

According to the seventh aspect, since switching of the positions of the holding portions is not performed during the welding step or loading step, it is possible to avoid poor welding of components and poor loading of components.

Effects of the Invention

According to the present invention, it is possible to provide a welding gun and a welding method which shorten the time waiting for loading of components, and thus capable of shortening of the tact time.

BRIEF DESCRIPTION OF THE DRAWINGS

FIG. 7 is a process drawing for explaining operation processes by the welding gun according to the present invention;

PREFERRED MODE FOR CARRYING OUT THE INVENTION

Figure 1:
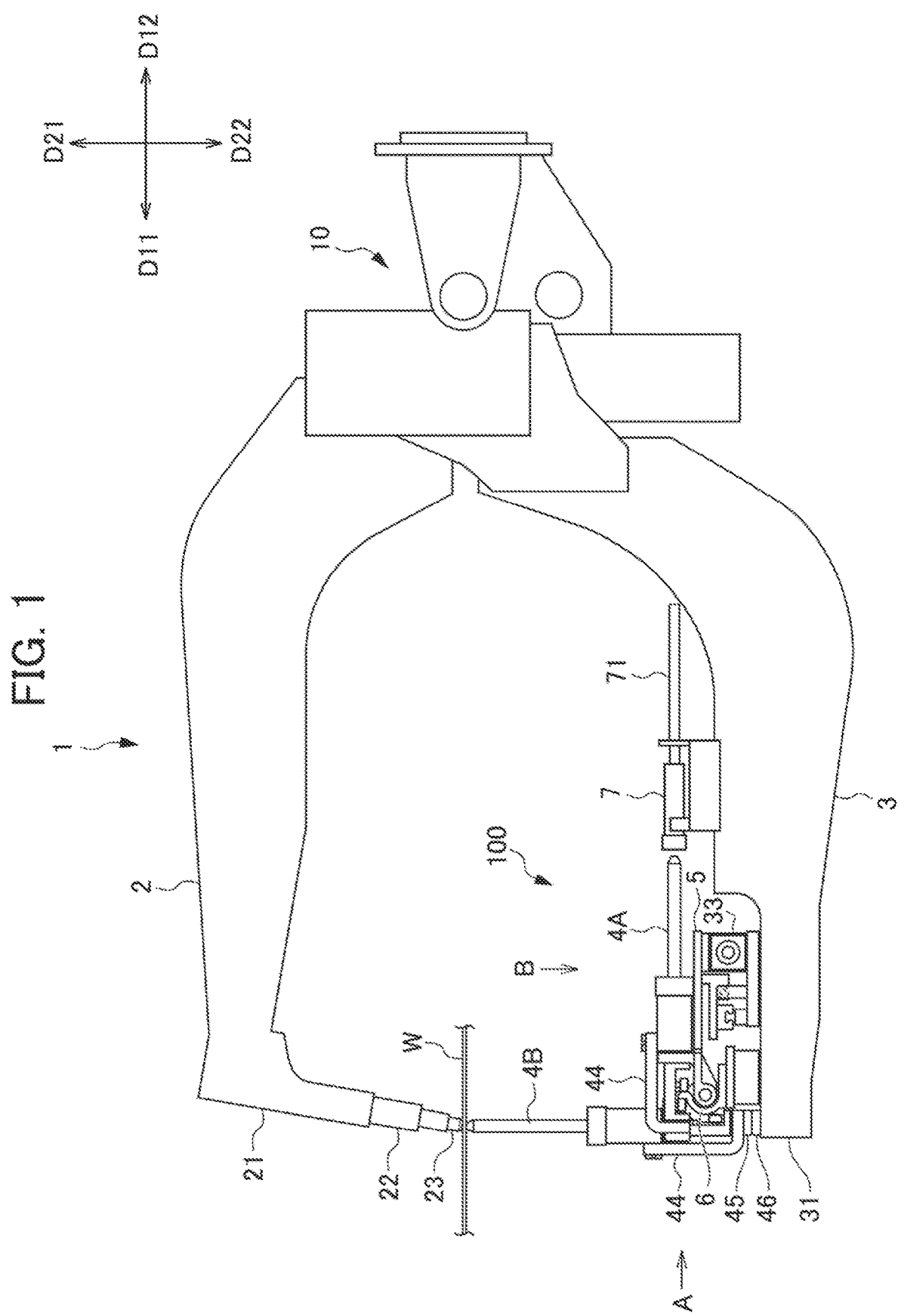
FIG. 1 is a side view showing an embodiment of a welding gun according to the present invention.
Figure 2:
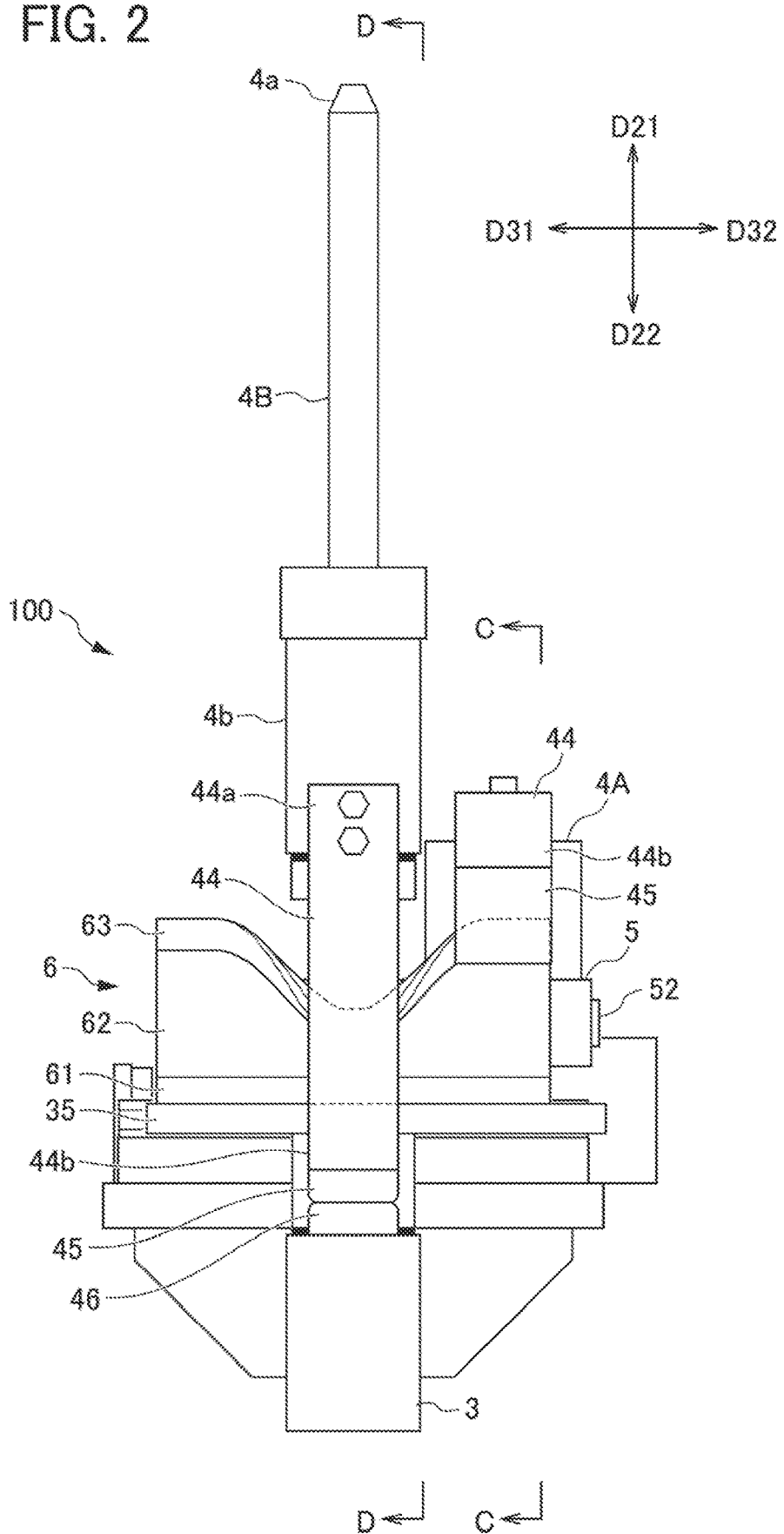
FIG. 2 is a front view when viewing the welding gun shown in FIG. 1 from an A direction.
Figure 3:
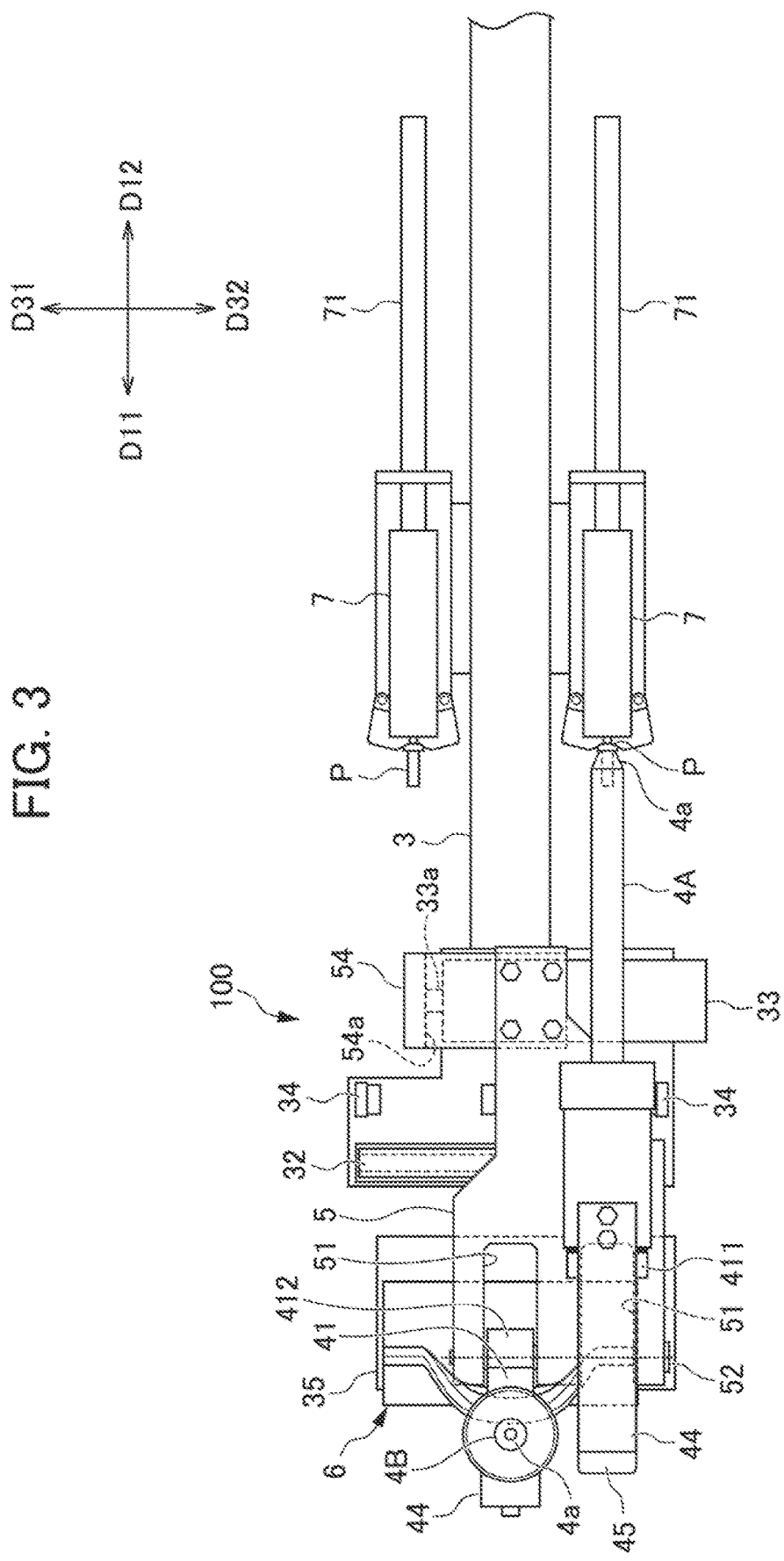
FIG. 3 is a plan view when viewing essential parts of the welding gun shown in FIG. 1 from a B direction.
Figure 4:
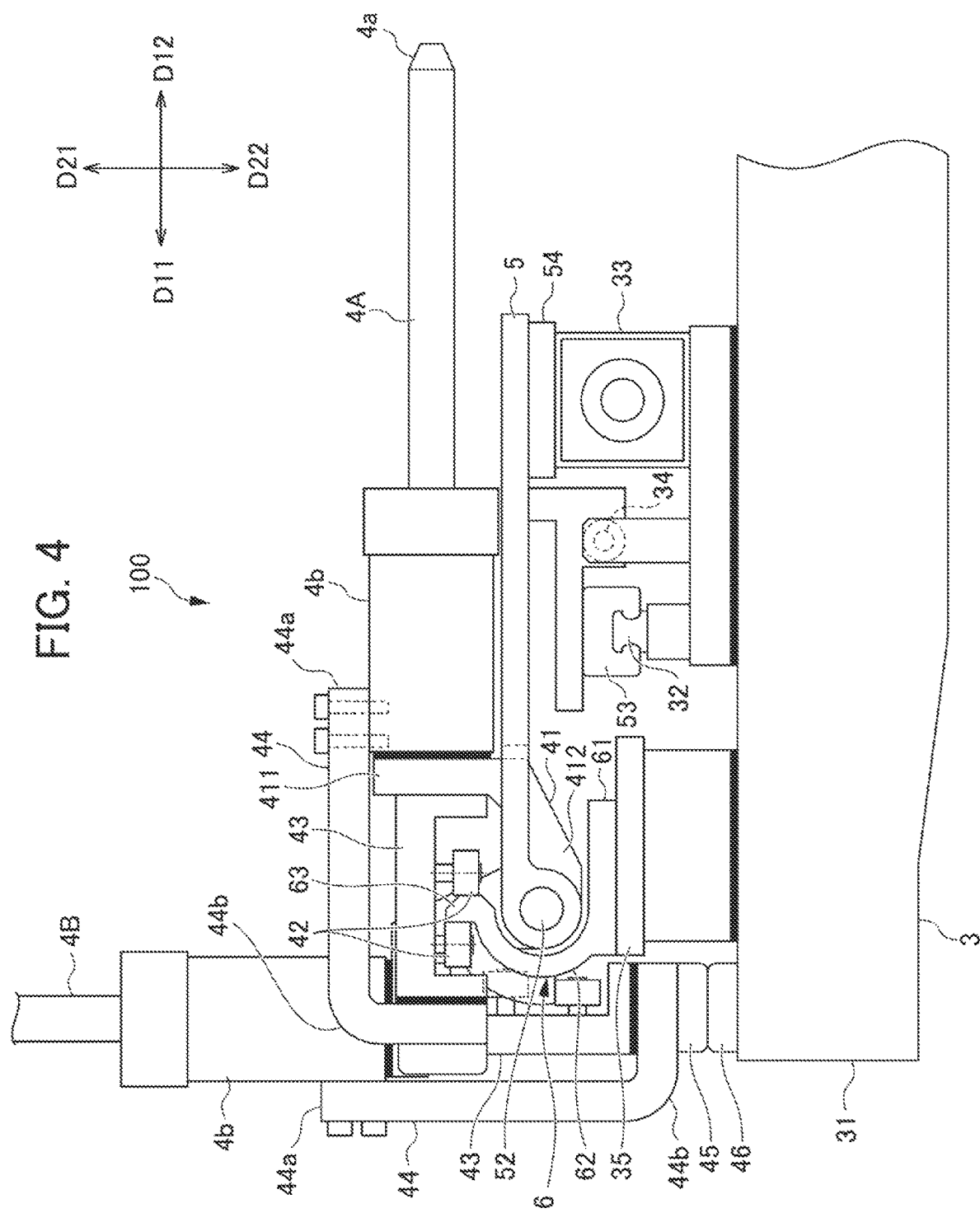
FIG. 4 is a cross-sectional view along the line C-C in FIG. 2.
Figure 5:
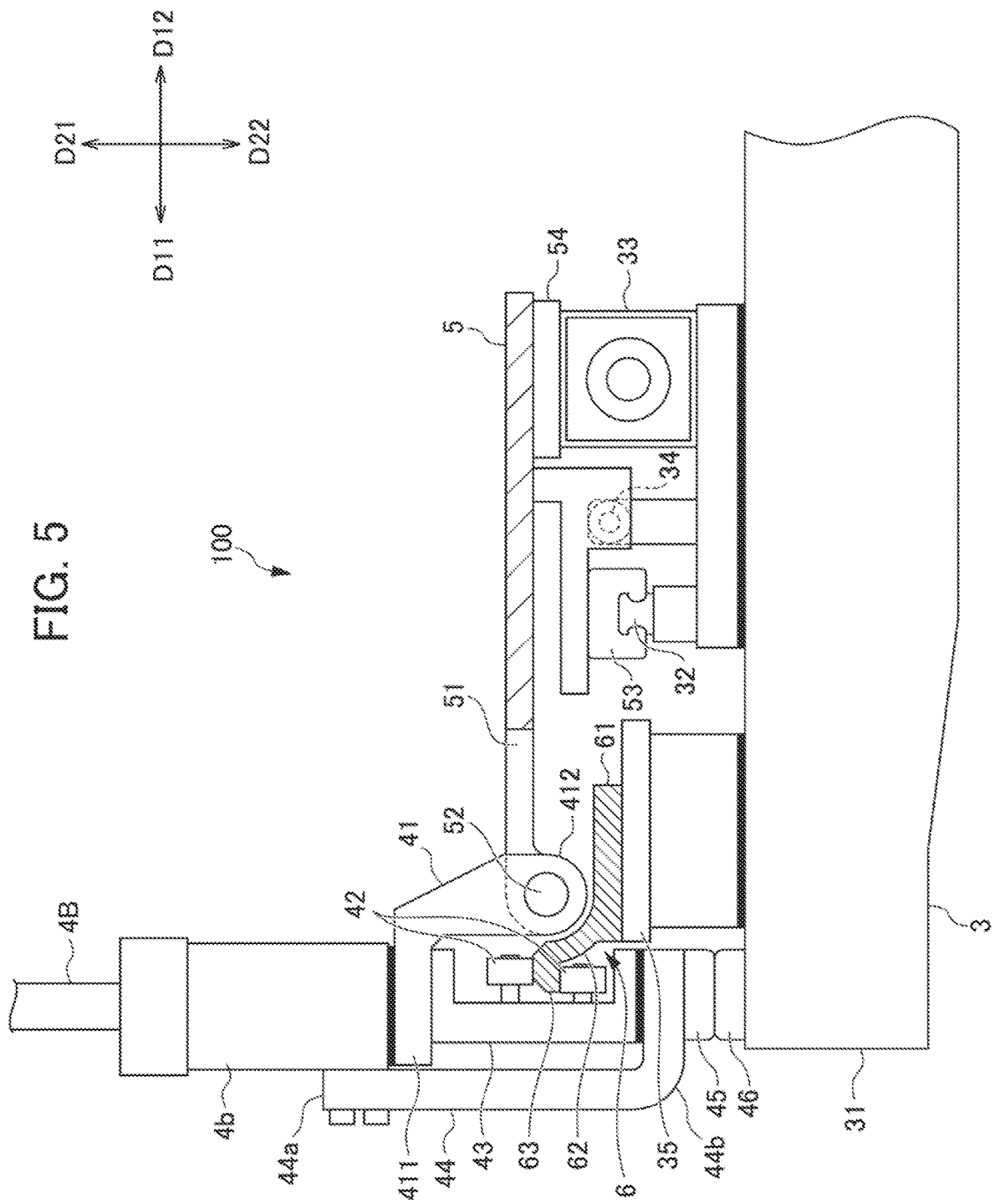
FIG. 5 is a cross-sectional view along the line D-D in FIG. 2.

Hereinafter, an embodiment of the present invention will be explained in detail by referencing the drawings. FIG. 1 is a side view showing an embodiment of a welding gun according to the present invention. FIG. 2 is a front view when viewing the welding gun shown in FIG. 1 from an A direction. FIG. 3 is a plan view when viewing essential parts of the welding gun shown in FIG. 1 from a B direction. FIG. 4 is a cross-sectional view along the line C-C in FIG. 2. FIG. 5 is a cross-sectional view along the line D-D in FIG. 2. It should be noted that the directions indicated by the cross-shaped arrows in the drawings indicate the directions relative to a welding gun 1 in the present disclosure. The D11-D12 direction indicates a front/rear direction of the welding gun 1. The D11 direction is on the forward side of the welding gun 1 (also referred to as leading end side), and the D12 direction is the rearward side of the welding gun 1 (also referred to as base end side). The D21-D22 direction indicates the up/down direction of the welding gun 1. The D21 direction is the upward side of the welding gun 1, and the D22 direction is the downward side of the welding gun 1. The D31-D32 direction indicates a width direction of the welding gun 1. The D31 direction is a direction towards a back side in the paper plane when basing on the welding gun 1 shown in FIG. 1, and the D32 direction is a direction towards a near side of the paper plane when basing on the welding gun 1 shown in FIG. 1.

As shown in FIG. 1, the welding gun 1 of the present embodiment has a mobile arm 2 arranged on an upper side in the drawing, and a fixed arm 3 arranged on a lower side in the drawing. The base end side of the mobile arm 2 is coupled with a mobile mechanism 10. The mobile arm 2 is thereby provided to the fixed arm 3 to make the leading side capable of advancing and retracting relative to the fixed arm 3. This welding gun 1 is mounted to a robot arm (not illustrated), and is configured to be moveable to any welding position on a workpiece such as metal panel material constituting the body of an automobile, by the operation of a robot (not illustrated).

A mobile electrode part 22 which projects towards the side of the fixed arm 3 is provided to the leading end 21 of the mobile arm 2. The mobile electrode part 22 has an electrode tip 23 at the leading end. On the other hand, a plurality of holding portions for holding components P such as stud bolts to be welded to the workpiece W is supported by the leading end 31 of the fixed arm 3. The welding gun 1 of the present embodiment has the two holding portions of a first holding portion 4A arranged on a near side in the paper plane of FIG. 1 (right side in FIG. 2), and a second holding portion 4B arranged on a back side in the paper plane of FIG. 1 (left side in FIG. 2). The welding gun 1 of the present embodiment can lighten the weight of the mobile arm 2, which is the mobile side, upon sandwiching the workpiece W, due to mounting this first holding portion 4A and second holding portion 4B to a side of the fixed arm 3. For this reason, it is possible to suppress the actuator provided to the mobile mechanism 10 for mobilizing the mobile arm 2 to the minimum size. As a result thereof, it is possible to make the entirety of the welding gun 1 to be light-weight and compact.

The first holding portion 4A and second holding portion 4B both have the same configuration consisting of rods. The first holding portion 4A and second holding portion 4B of the present embodiment have functions of holding a component P made of metal to be welded to the workpiece W at a leading end thereof, as well as functioning also as a fixed electrode part that supplies electric power to the component P. In other words, this first holding portion 4A and second holding portion 4B, upon the mobile arm 2 moving in a direction approaching the fixed arm 3, make pressurized contact to sandwich the workpiece W between the electrode tip 23 of the mobile electrode part 22 provided to the mobile arm 2 and the held component P. In this state, by flowing electrical current between the mobile electrode part 22 and the fixed electrode part configured by the first holding portion 4A and second holding portion 4B, an abutting part (spot) of the component P is locally melted by the resistance heating generated at the abutting surface between the component P and workpiece W to weld the component P to the workpiece W.

In this way, the first holding portion 4A and second holding portion 4B of the welding gun 1 of the present embodiment both also serve as energizing parts which supply electric power to the component P. Since it is unnecessary to separately provide a member which holds the component P and an energizing part which supplies electric power, the structure of the welding gun 1 can be simplified, and the welding gun 1 can be made lighter weight and more compact. It should be noted that, hereinafter, in the case of generically naming without distinction the first holding portion 4A and second holding portion 4B, they are simply referred to as "holding portion 4". The number of holding portions provided to the welding gun of the present invention is not limited to two so long as being plural.

The first holding portion 4A and second holding portion 4B are provided to be switchable between an "abutment-enabling position" for causing the part P to abut the workpiece W, and a "loading-enabling position" for receiving loading of the component P, by a switching mechanism 100. Hereinafter, the specific configuration of the switching mechanism 100 for switching this first holding portion 4A and second holding portion 4B between the "abutment-enabling position" and "loading-enabling position" will be explained.

The first holding portion 4A and second holding portion 4B are each fixed to a swing arm 41 provided separately, as shown in FIGS. 4 and 5. Each of the swing arms 41 is formed in a substantially L shape in a side view, by a fixed part 411 fixing the holding portion 4, and a shaft mounting part 412 arranged substantially orthogonal to this fixed part 411.

The shaft mounting part 412 of each swing arm 41 is held to the leading end of a slide arm 5 arranged on the fixed arm 3. The slide arm 5 is arranged along the front/rear direction (D11-D12 direction) of the fixed arm 3, above the leading end 31 of the fixed arm 3. The leading end side of the slide arm 5 has two holding grooves 51 for sandwiching each swing arm 41 therebetween, by branching into three in the width direction (D31-D32 direction), as shown in FIG. 3. Each holding groove 51 has a shape opening towards the leading end side (D11 direction) of the fixed arm 3.

A shaft 52 extending in the width direction is provided over the two holding grooves 51, at the leading end of the slide arm 5. The shaft mounting parts 412 of each swing arm 41 are respectively arranged within the holding groove 51, and mounted by fitting to the outer circumference of the shaft 52. The first holding portion 4A and second holding portion 4B become rotatable independently from each other in the front/rear direction of the fixed arm 3, centered around the shaft 52. It should be noted that the circumferential edge face of the shaft mounting part 412 is formed in an arc shape centered around the shaft 52.

It should be noted that, in the welding gun 1 shown in FIGS. 1 to 5, the first holding portion 4A is in a posture position laid down approximately horizontal relative to the fixed arm 3, by rotating to the rearward side (D12 direction) centered around the shaft 52. In addition, the second holding portion 4B is in a posture position standing up substantially vertical relative to the fixed arm 3, by rotating to the forward side (D11 direction) centered around the shaft 52. The posture position of the first holding portion 4A shown is the "loading-enabling position" of the present invention, and the posture position of the second holding portion 4B is the "abutment-enabling position" of the present invention.

A guide rail 32 extending along the width direction (D31-D32 direction) of the fixed arm 3 is provided to the upper face of the fixed arm 3, as shown in FIGS. 3 to 5. A slider 53 mounted to the lower face side of the slide arm 5 engages with the guide rail 32. In addition, a bracket 54 is mounted to a base end side of the slide arm 5. An end 54*a* of the bracket 54 is coupled with a piston rod 33*a* of the air cylinder 33 provided to the upper face of the fixed arm 3. The piston rod 33*a* of the air cylinder 33 is configured so as to reciprocally move along the width direction (D31-D32) of the fixed arm 3. Therefore, the slide arm 5 is configured to be slidingly movable in the width direction of the fixed arm 3 along the guide rail 32, by receiving the drive force of the piston rod 33*a* of the air cylinder 33 via the bracket 54. Accompanying the sliding movement of this slide arm 5, the first holding portion 4A and second holding portion 4B also integrally slidingly move along the width direction of the fixed arm 3.

It should be noted that the stop position on both ends of the movement stroke of the slide arm 5 are detected by limit switches (not shown), and the start and stop of the air cylinder 33 are controlled with this detection signal as a trigger. As shown in FIG. 3, stoppers 34 are respectively provided in the vicinity of both ends of the guide rail 32, and during sliding movement of the slide arm 5, the movement stroke comes to be restricted by abutting with either of the stoppers 34.

In addition, to the upper face of the fixed arm 3, a table 35 having a predetermined width spanning in the width direction of the fixed arm 3 is provided more to the leading end side than the guide rail 32. The table 35 has a flat upper face. The leading end of the slide arm 5 rotatably supports the first holding portion 4A and second holding portion 4B above this table 35.

A cam 6 is fixed to the upper face of the table 35. The cam 6 is formed by a plate-shaped member having a predetermined thickness. The cam 6 has a shape curved so as to wrap around the leading end side of the slide arm 5 from below to above the slide arm 5 arranged above the table 35. This cam 6 functions as a guide member which operates together with the sliding movement in the width direction of the slide arm 5 for switching the first holding portion 4A and second holding portion 4B to either of "abutment-enabling position" or "loading-enabling position".

Figure 6:
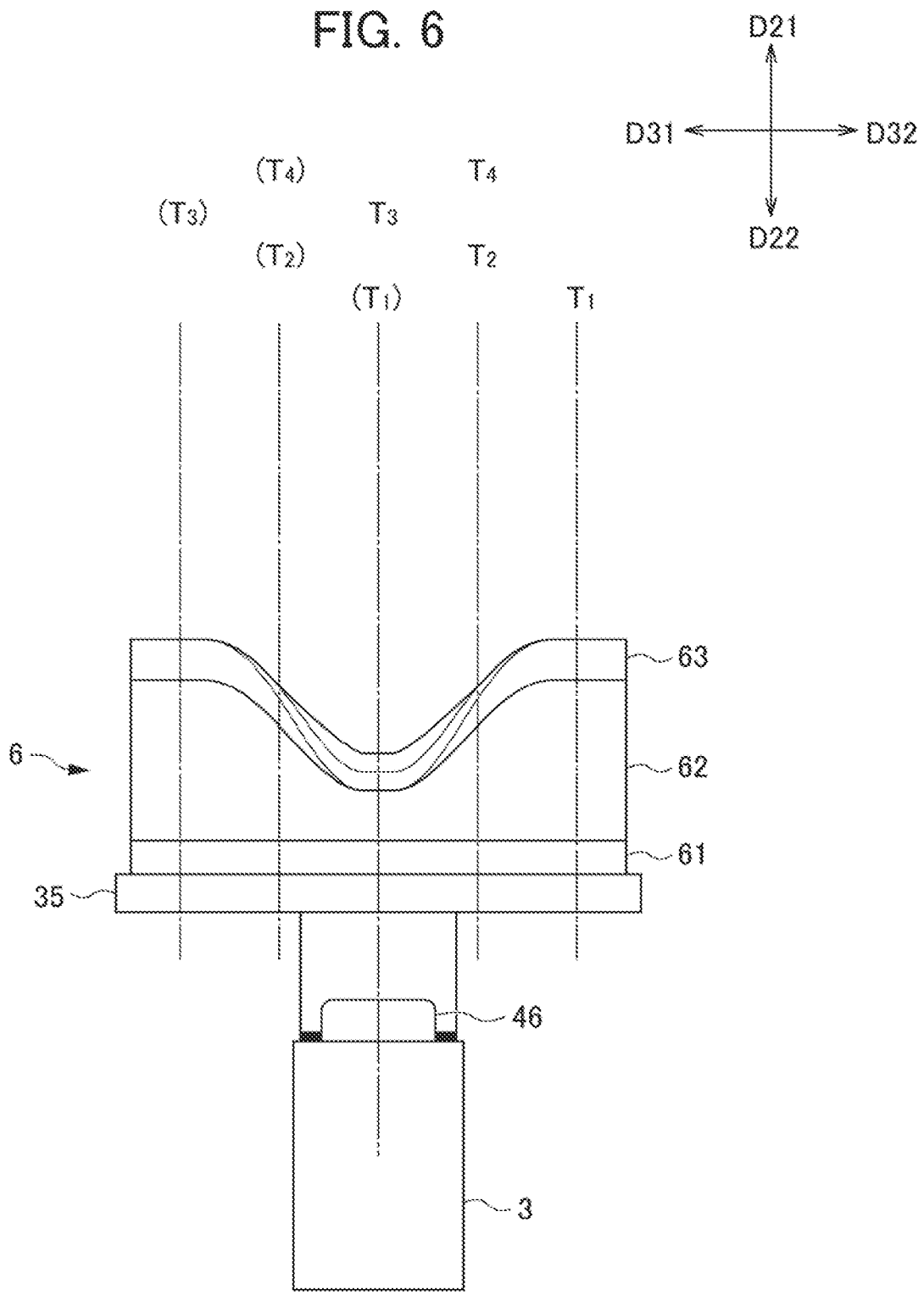
FIG. 6 is a view showing a cam of the welding gun shown in FIG. 1, and the position of a holding portion at the time during operation of the welding gun.

The specific shape of this cam 6 will be further explained by referencing FIG. 2 and FIGS. 4 to 6. FIG. 6 shows an aspect viewing the cam 6 on the table 35 from the front (A direction in FIG. 1). The cam 6 integrally has a base-plate part 61, a curved-plate part 62 and a guide-plate part 63. The base-plate part 61 is formed in a flat plate shape, and fixes the cam 6 on the table 35 by being mounted to the table 35. The curved-plate part 62 curves in a circular arc shape from the leading end side of the base-plate part 61 upwards. The guide-plate part 63 is provided along the upper edge of the curved plate part 62.

The curved-plate part 62 and guide-plate part 63 will be further explained. The curved-plate part 62 curves in a circular arc shape to be convex at the leading end side of the fixed arm 3 centered around the shaft 52. The curved-plate part 62, as shown in FIG. 4, has a circular arc shape of about 180° at both ends in the width direction of the cam 6; whereas, it has a circular arc shape of about 90° at the central part in the width direction of the cam 6, as shown in FIG. 5. The curved-plate part 62 curves continuously from both ends in the width direction towards the central part of the cam 6. The leading end side of the slide arm 5, i.e. shaft 52 of the slide arm 5 and shaft mounting part 412 of each swing arm 41, is arranged to be accommodated inside (concave side) of this curved-plate part 62.

The guide-plate part 63 is formed in a strip shape having a fixed width. This guide-plate part 63 extends so as to stand up towards the outer side in the radial direction of the circular arc shape of the curved-plate part 62, at the upper edge of the curved-plate part 62. More specifically, at both ends in the width direction of the cam 6, the guide-plate part 63 is respectively formed so as to project substantially vertically towards above the fixed arm 3, as shown in FIG. 4. On the other hand, at the central part in the width direction of the cam 6, the guide plate part 63 is formed so as to project substantially horizontally towards the leading end side of the fixed arm 3, as shown in FIG. 5.

The curved-plate part 62, due to continuously curving in the width direction of the cam 6, is formed continuously in the width direction of the cam 6 also on the upper edge of the curved-plate part 62. Therefore, the guide-plate part 63 forms a guide surface which continuously changes from up oriented to horizontal oriented, from both ends towards the central part of the cam 6. It should be noted that the site at which the guide-plate parts 63 each become up oriented at both ends is referred to as "first site", and the site at which the guide-plate part 63 becomes horizontal oriented at the central part is referred to as "second site".

A fixed part 411 of each swing arm 41, when the holding portion 4 is in the lying posture arranged in the "loading-enabling position", is arranged so as to project towards above the fixed arm 3 relative to the shaft mounting part 412, and when the holding portion 4 is in the standing posture arranged in the "abutment-enabling position", is arranged so as to project towards the leading end side of the fixed arm 3 relative to the shaft mounting part 412. In the fixed part 411 of each swing arm 41, a pair of rollers 42 is arranged on an opposite side to the side on which the holding portion 4 is fixed.

The pair of rollers 42 is rotatably supported by a roller support part 43 fixed to an opposing surface of the surface of the fixed part 411 to which the holding portion 4 is fixed. The rotation axis of the pair of rollers 42 is arranged so as to follow the up/down direction (D21-D22 direction), when the holding portion 4 is in the "loading-enabling position" as shown in FIG. 4, and so as to follow the front/rear direction (D11-D12 direction) of the fixed arm 3, when the holding portion 4 is in the "abutment-enabling position" as shown in FIG. 5.

The pair of rollers 42 sandwiches the guide plate part 63 of the cam 6 from both sides. The holding portion 4 thereby engages with the cam 6 via the pair of rollers 42. The pair of rollers 42 rolls subordinate to a change in the standing direction of the guide-plate part 63 accompanying the slide arm 5 slidingly moving in the width direction along the guide rail 32. Then, when the pair of rollers 42 move to a first site of the guide-plate part 63, the rotation axis of the pair of rollers 42 is arranged so as to follow the up/down direction of the fixed arm 3, and causes the swing arm 41 to rotate rearwards centered around the shaft 52. As a result thereof, the holding portion 4 becomes the lying posture, and arranged in the "loading-enabling position". On the other hand, when the pair of rollers 42 moves to a second site of the guide-plate part 63, the rotation axis of the pair of rollers 42 is arranged so as to follow the front/rear direction of the fixed arm 3, and causes the swing arm 41 to rotate forwards centered around the shaft 52. As a result thereof, the holding portion 4 becomes the standing posture, and is arranged in the "abutment-enabling position".

Herein, due to the first holding portion 4A and second holding portion 4B being juxtaposed in the width direction of the fixed arm 3, the location at which the pair of rollers 42 on the side of the first holding portion 4A engages with the guide-plate part 63, and the location at which the pair of rollers 42 on the side of the second holding portion 4B engages with the guide-plate part 63 differ in the width direction of the cam 6. More specifically, when the slide arm 5 is arranged at the end on the nearest side of the movement stroke (D32 direction side) (when in the state shown in FIGS. 1 to 5), the pair of rollers 42 on the side of the first holding portion 4A sandwiches the first site of the guide-plate part 63 (refer to FIG. 4), and the pair of rollers 42 on the side of the second holding portion 4B sandwiches the second site of the guide-plate part 63 (refer to FIG. 5). The first holding portion 4A is thereby arranged at the "loading-enabling position", and the second holding portion 4B is arranged at the "abutment-enabling position".

From this state, when the slide arm 5 moves to the backmost side of the movement stroke (D31 direction), the pair of rollers 42 on the side of the first holding portion 4A moves from the first site towards the second site along the guide-plate part 63, and the pair of rollers 42 on the side of the second holding portion 4B moves from the second site towards the first site along the guide-plate part 63. Then, when the slide arm 5 reaches the end on the back side of the movement stroke, the pair of rollers 42 on the side of the first holding portion 4A sandwiches the second site of the guide-plate part 63, and the pair of rollers 42 on the side of the second holding portion 4B sandwiches the first site of the guide-plate part 63. The first holding portion 4A is thereby switched to the "abutment-enabling position", and the second holding portion 4B is switched to the "loading-enabling position".

By the switching mechanism 100 configured in the above way, the first holding portion 4A and second holding portion 4B of the welding gun 1 are made switchable between the "loading-enabling position" and "abutment-enabling position". This switching operation is alternately performed by the first holding portion 4A and second holding portion 4B. Therefore, as shown in FIGS. 1 to 5, when one holding portion 4 is switched to the "loading-enabling position", the other holding portion 4 is switched to the "abutment-enabling position". Since this switching mechanism 100 is a configuration which switches the posture of the holding portions 4 by the cam 6, the drive source for switching is achieved only with the drive source (air cylinder 33 in present embodiment) for moving the slide arm 5 in the width direction, and a dedicated drive source for standing up or laying down the holding portion 4 is unnecessary. For this reason, the switching mechanism 100 is simply configurable.

The holding portion 4 receives loading of a component P to the leading end 4A when arranged in the "loading-enabling position". More specifically, as shown in FIGS. 1 and 3, when the holding portion 4 is arranged in the "loading-enabling position" and assumes the lying posture, a pair of magazines 7 for loading the components P to the leading end 4a is respectively arranged at the fixed arm 3. A plurality of components P to be welded to the workpiece W is stored in the magazine 7. The components P in the magazine 7 are loaded one by one into the leading end 4a of the holding portion 4 arranged in the "loading-enabling position" by a supply device 71 using air or the like, for example.

On the other hand, when the component P held at the leading end 4a is made to abut the workpiece W, electric power is supplied from the fixed arm 3 to the electrode tip 23 provided to the mobile electrode part 22 of the mobile arm 2. More specifically, as shown in FIGS. 4 and 5, one end 44a of a conductive plate 44 of substantially L shape in a side view for supplying electrical current from the fixed arm 3 to the holding portion 4 is fixed to a side face of the base end 4b of the holding portion 4. The conductive plate 44 extends from the base end 4b of the holding portion 4 in the opposite direction to the holding portion 4, exceeding the fixed part 411 of the swing arm 41. The other end 44b of the conductive plate 44 is fixed to the end face of the roller support part 43 on the opposite side to the fixed part 411. The roller support part 43 becomes a form sandwiched between the fixed part 411 of the swing arm 41 and the other end 44b of the conductive plate 44.

At the other end 44b of the conductive plate 44, a mobile-side electrode plate 45 is fixed to the opposite face side to the roller support part 43. On the other hand, the fixed-side electrode plate 46 is provided more to the leading end side than the table 35 on the top face of the fixed arm 3. The electric power from the fixed arm 3 is supplied to the fixed-side electrode plate 46. As shown in FIGS. 4 and 5, the mobile-side electrode plate 45 and fixed-side electrode plate 46, when the holding portion 4 is switched to the "abutment-enabling position", and the welding pressure acts by sandwiching the workpiece W between the mobile electrode part 22 of the mobile arm 2 during welding, are arranged so as closely contact together and be electrically connected. At the component P on the leading end 4a of the holding portion 4 arranged in the "abutment-enabling position", the electric power is thereby supplied between the electrode tip 23 on the side of the mobile arm 2 through the mobile-side electrode plate 45, conductive plate 44 and base end 4b of the holding portion 4 from the fixed arm 3, and the component P is welded to the workpiece W by resistance heating. This mobile-side electrode plate 45 and fixed-side electrode plate 46 are preferably configured from tungsten having higher hardness than copper, etc., from the viewpoint of improving durability and conductivity.

Next, a welding method by this welding gun 1 will be explained by referencing FIGS. 6 to 11B. T1 to T4 shown in FIG. 6 indicate the times during a work operation of the welding gun 1 of the present embodiment. FIG. 7 is a process drawing for explaining the work process by the welding gun 1. FIGS. 8A to 11B are views for explaining the positions of the first holding portion and second holding portion at each time in FIG. 6. FIGS. 8A to 11B schematically show only the main parts of the switching mechanism 100 for facilitating understanding of the explanation. It should be noted that the positions indicated by T1 to T4 in FIG. 6 show the respective positions of the first holding portion 4A and second holding portion 4B relative to the cam 6 at this time (positions at which the pair of rollers 42 sandwich the guide plate part 63 of the cam 6). FIG. 6 shows only the time of the second holding portion 4B in parenthesis, in order to distinguish the times of the first holding portion 4A and second holding portion 4B.

Figure 8A:
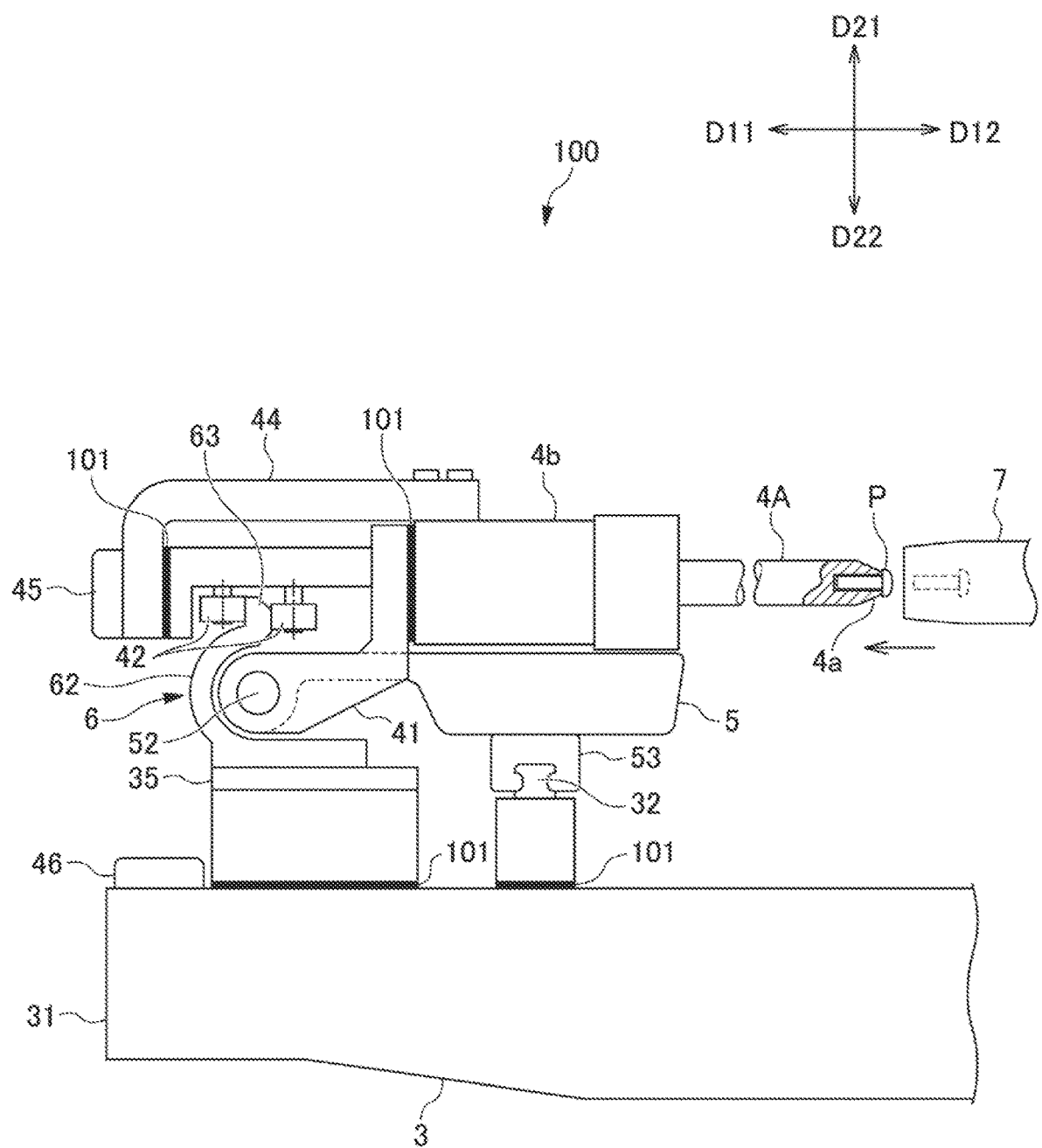
FIG. 8A is a view for explaining the position of a first holding portion at time T1 in FIG. 6.

First, the robot executes a welding step. At this time, the welding gun 1 is moved by a robot (not shown) to be arranged at a predetermined spot position (welding position) of the workpiece W. In this welding step, the pair of rollers 42 of the first holding portion 4A sandwiches a first position of the guide-plate part 63 arranged at an end in the width direction of the cam 6 at time T1. The first holding portion 4A is thereby arranged at the "loading-enabling position" lying down rearwards, as shown in FIG. 8A. At this time, one component P (first part) from the magazine 7 is supplied to the leading end 4a of the first holding portion 4A and held thereto (first loading step).

Figure 8B:
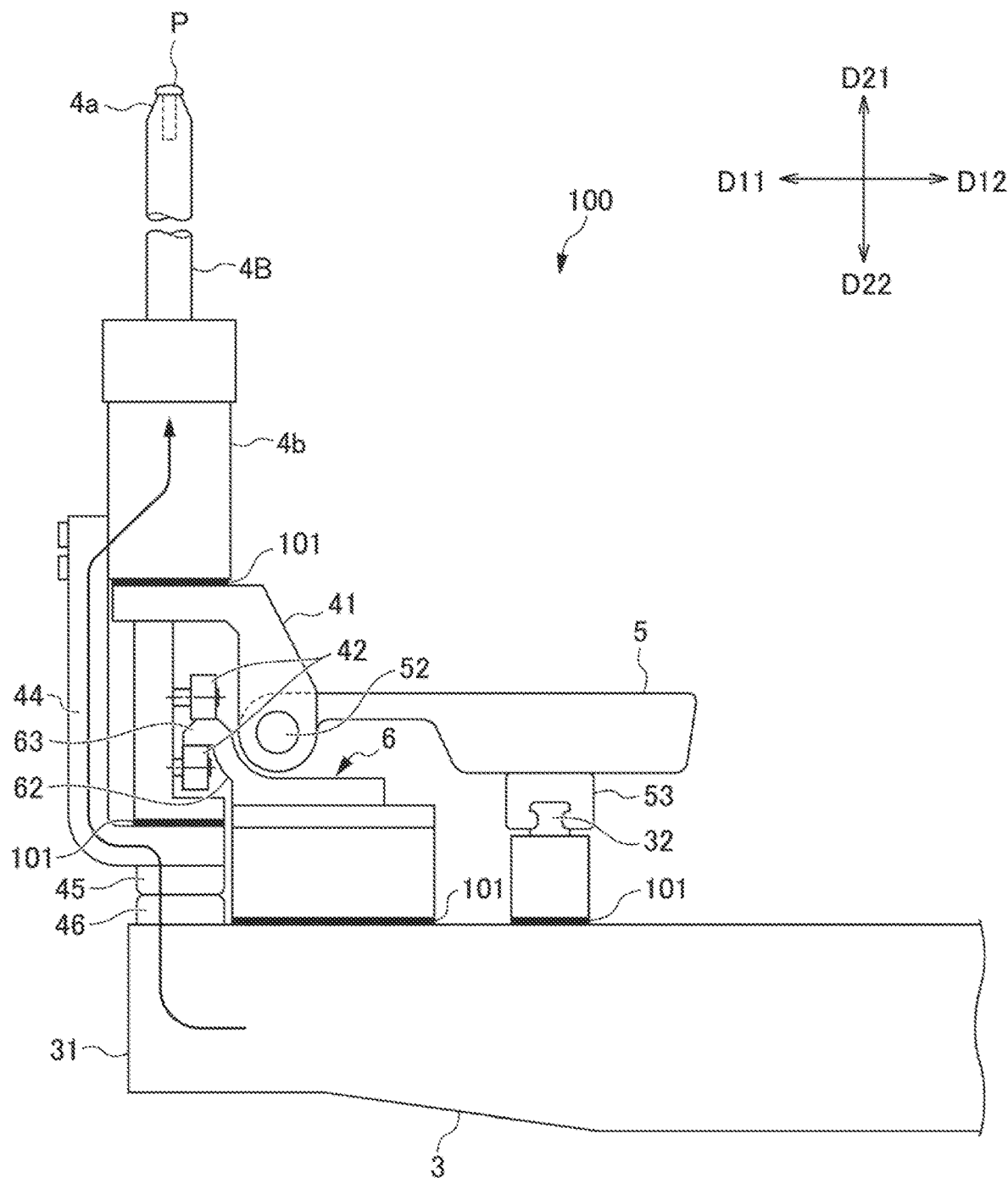
FIG. 8B is a view for explaining the position of a second holding portion at time T1 in FIG. 6.

In addition, at the same time T1, the pair of rollers 42 of the second holding portion 4B sandwiches a second position on the guide-plate part 63 arranged at a central part in the width direction of the cam 6. The second holding portion 4B is thereby arranged at the "abutment-enabling position" standing, as shown in FIG. 8B. At this time, one component P (second part) already supplied from the magazine 7 is held at the leading end 4a of the second holding portion 4B. In this state, the welding gun 1 sandwiches the workpiece W by the mobile electrode part 22 of the mobile arm 2 and the second holding portion 4B of the fixed arm 3. By the second holding portion 4B standing up, the mobile-side electrode plate 45 of the second holding portion 4B and the fixed-side electrode plate 46 of the fixed arm 3 closely contact, and electric power is supplied from the side of the fixed arm 3 to the component P in the second holding portion 4B, as in the energizing path shown by the arrows in FIG. 8B. The component P is thereby welded to the workpiece W by resistance heating (second welding step).

In this welding step, a first loading step is executed at a time overlapping the second welding step. More specifically, as shown in FIG. 7, the first loading step of loading the component P to the first holding portion 4A in the present embodiment is executed only during the second welding step of welding the component P held in the second holding portion 4B to the workpiece W, i.e. from the start to finish of the second welding step.

It should be noted that the site indicated by reference number 101 in FIGS. 8A to 11B shows the site of an insulator of the switching mechanism 100. The electric power from the fixed arm 3 thereby comes to be supplied to the holding portion 4 through only the fixed-side electrode plate 46, mobile-side electrode plate 45 and conductive plate 44.

After the second welding step is executed by the second holding portion 4B, the robot executes the movement step causing the welding gun 1 to move until the next spot position (welding position) on the workpiece W. In this movement step, while the welding gun 1 is moving, switching of the positions of the first holding portion 4A and second holding portion 4B is performed by the switching mechanism 100 (first switching step). In other words, in the first switching step, in order to switch the positions of the first holding portion 4A and second holding portion 4B, the slide arm 5 moves in the width direction (D31 direction), and accompanying this, the position at which the pair of rollers 42 sandwiches the guide-plate part 63 of the cam 6 also changes from the position during T1 to the position during T2.

Figure 9A:
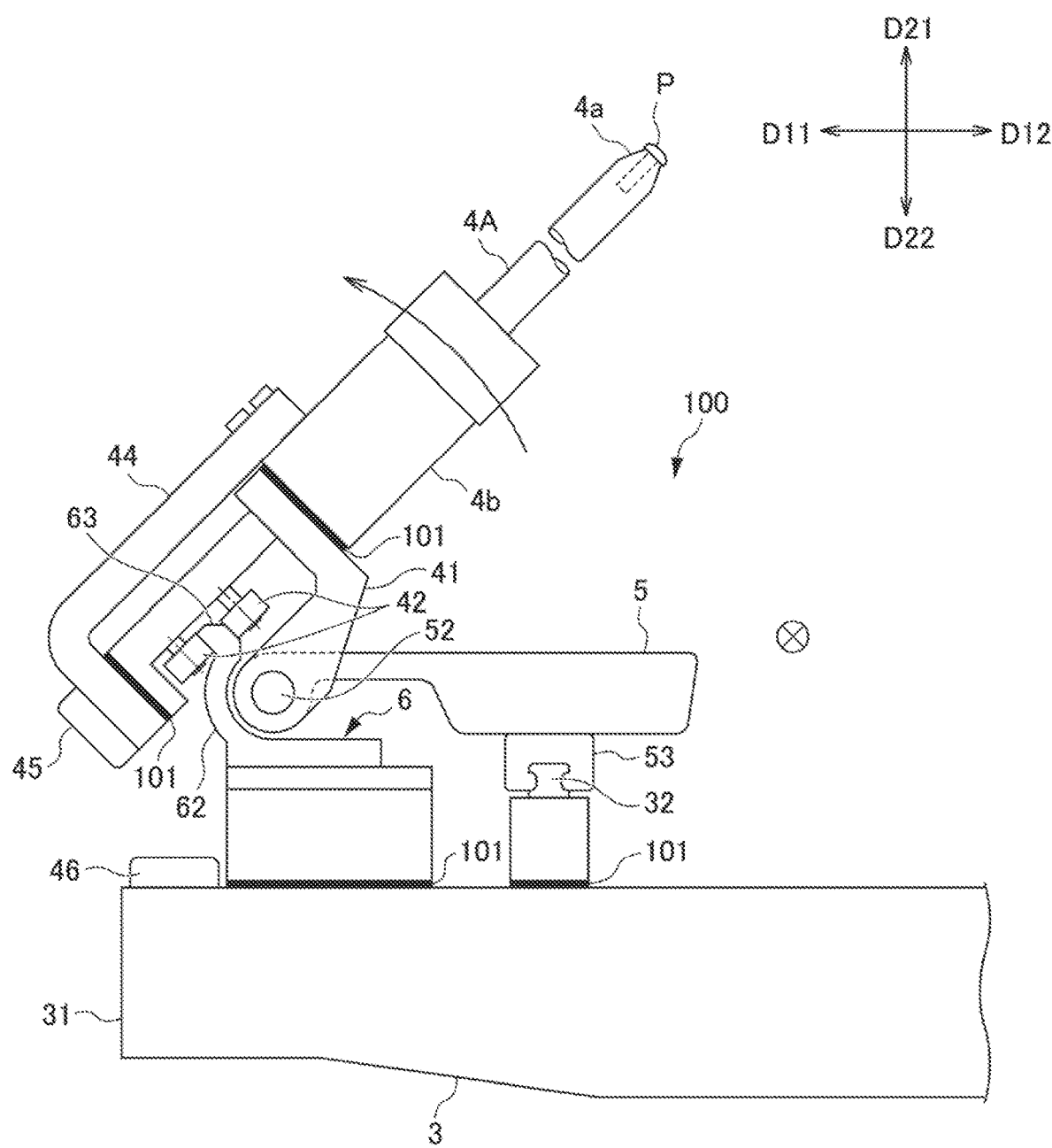
FIG. 9A is a view for explaining the position of the first holding portion at time T2 in FIG. 6.
Figure 9B:
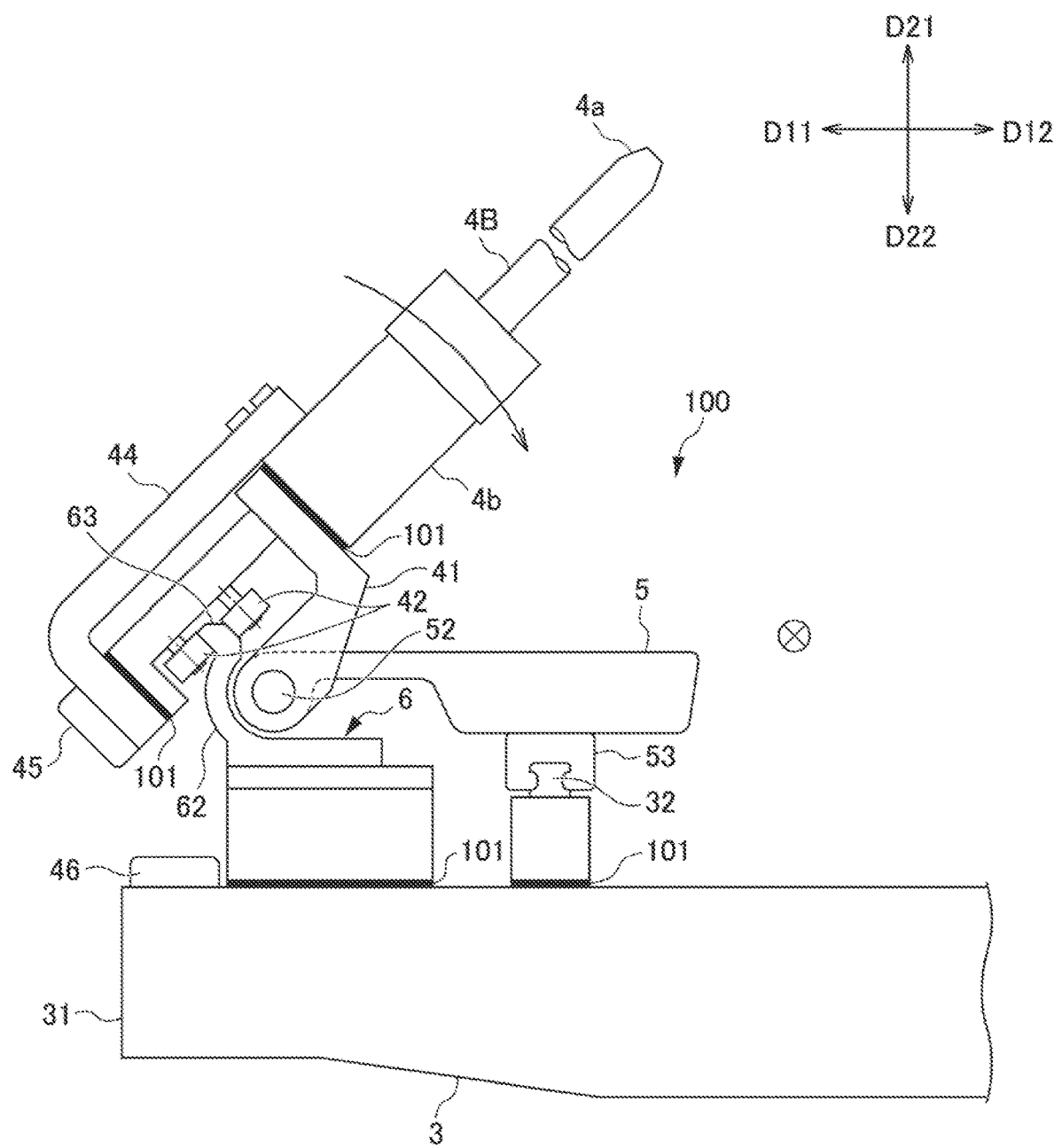
FIG. 9B is a view for explaining the position of the second holding portion at time T2 in FIG. 6.

At time T2, the pair of rollers 42 of the first holding portion 4A is in the middle of movement from the first position towards the second position on the guide-plate part 63 of the cam 6, and sandwiches a position substantially in the middle between the first position and the second position. The first holding portion 4A thereby rotates forwards from the lying posture towards the abutment-enabling position to become the standing posture, as shown in FIG. 9A. The component P (first component) supplied in the first loading step is held at the leading end 4a of this first holding portion 4A.

At the same time T2, the pair of rollers 42 of the second holding portion 4B is in the middle of movement from the second position towards the first position on the guide-plate part 63 of the cam 6, and sandwiches a position at substantially in the middle between the second position and first position. The second holding portion 4B having finished welding thereby rotates rearwards from the standing posture towards the loading-enabling position to become the lying posture.

This first switching step is performed at a time overlapping the movement step. In other words, the first switching step is executed at a time overlapping the time at which the welding gun 1 moves to the next spot position on the workpiece W. In the present embodiment, the first switching step comes to be executed at a time completely overlapping the time from the start to finish of the movement step.

Figure 10A:
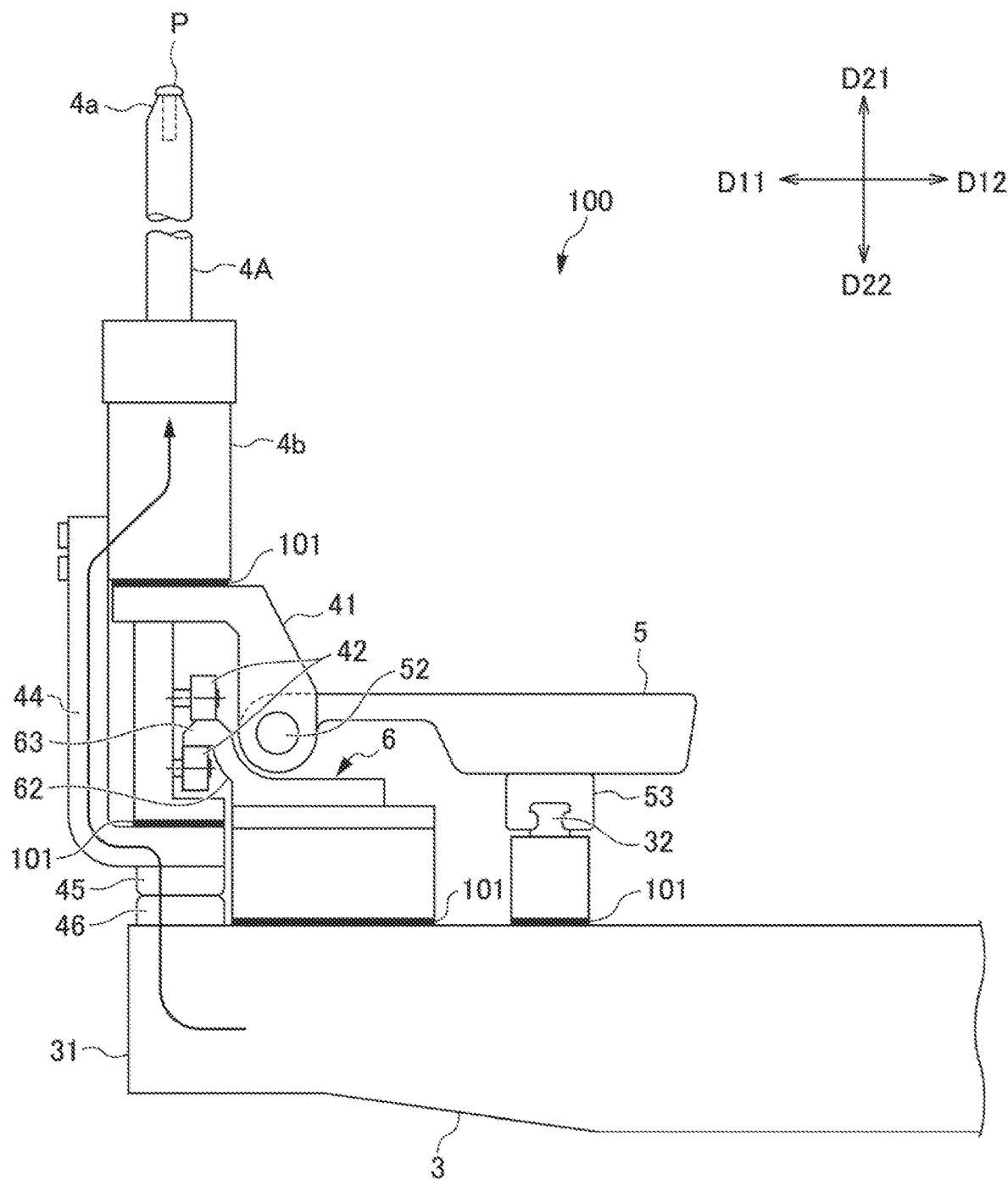
FIG. 10A is a view for explaining the position of the first holding portion at time T3 in FIG. 6.

Next, when the slide arm 5 further moves in the width direction (D31 direction), and the first holding portion 4A and second holding portion 4B move to the positions of time T3, the robot executes the welding step again. In this welding step, the pair of rollers 42 of the first holding portion 4A sandwiches the second position of the guide-plate part 63 arranged at the central part in the width direction of the cam 6, at time T3. The first holding portion 4A is arranged at the "abutment-enabling position" standing up, as shown in FIG. 10A. At this time, one component P (first component) already supplied from the magazine 7 is held at the leading end 4a of the first holding portion 4A. In this state, the welding gun 1 sandwiches the workpiece W with the mobile electrode part 22 of the mobile arm 2 and the first holding portion 4A of the fixed arm 3. By the first holding portion 4A standing up, the mobile-side electrode plate 45 of the first holding portion 4A and the fixed-side electrode plate 46 of the fixed arm 3 closely contact, and electric power is supplied from the side of the fixed arm 3 to the component P of the first holding portion 4A, as in the energizing path shown by arrows in FIG. 10A. The component P is thereby welded to the workpiece W by way of resistance heating (first welding step).

Figure 10B:
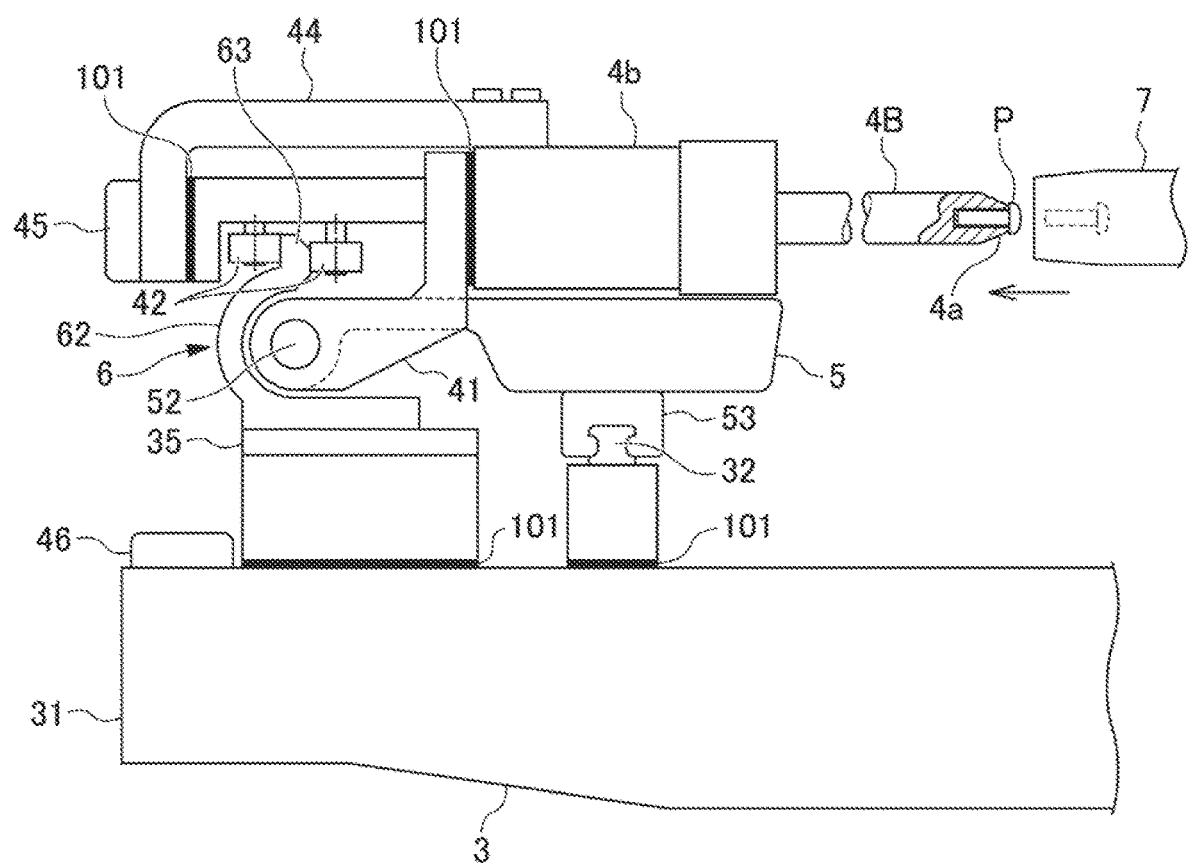
FIG. 10B is a view for explaining the position of the second holding portion at time T3 in FIG. 6.

At the same time T3, the pair of rollers 42 of the second holding portion 4B sandwiches the first position of the guide-plate part 63 arranged at the end in the width direction of the cam 6. The second holding portion 4B is thereby arranged in the "loading-enabling position" lying down rearwards, as shown in FIG. 10B. At this time, one component P (second component) is newly supplied from the magazine 7 and held in the leading end 4a of the second holding portion 4B (second loading step).

In this welding step, the second loading step is executed at a time overlapping with the first welding step. More specifically, as shown in FIG. 7, the second loading step of loading the part P to the second holding portion 4B in the present embodiment is executed only during the first welding step of welding the component P held in the first holding portion 4A to the workpiece W, i.e. during the time from start to finish of the first welding step.

After the first welding step has been executed by the first holding portion 4A, the robot executes again the movement step of moving the welding gun 1 further to the next spot position (welding position) on the workpiece W. In this movement step, switching of the positions of the first holding portion 4A and second holding portion 4B is performed again by the switching mechanism 100 (second switching step), while the welding gun 1 is moving. In other words, in the second switching step, in order to switch the positions of the first holding portion 4A and second holding portion 4B, the slide arm 5 moves in the reverse direction (D32 direction) as during the first switching step, and accompanying this, the position at which the pair of rollers 42 sandwiches the guide-plate part 63 of the cam 6 also changes from the position during T3 to the position during T4.

Figure 11A:
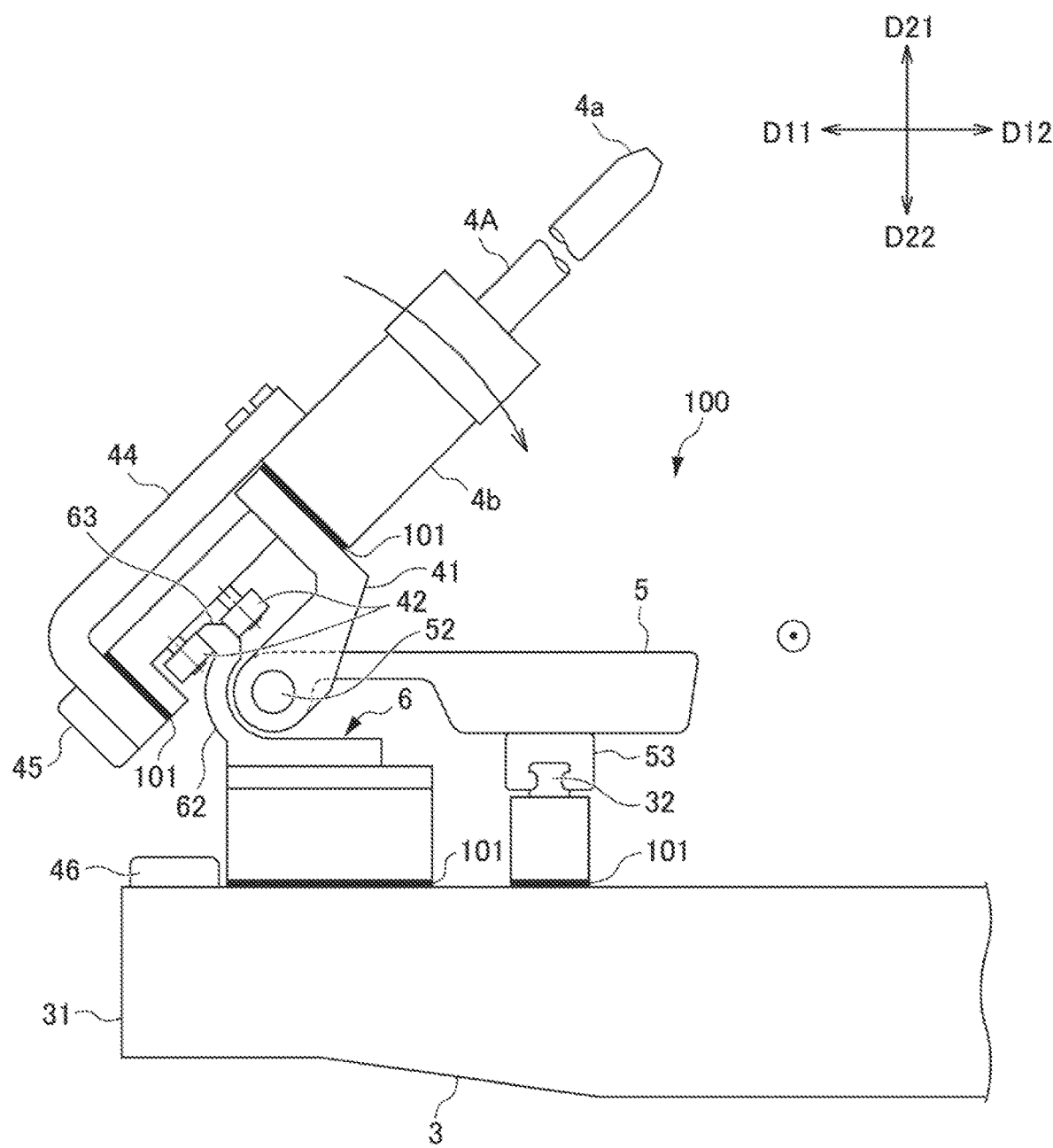
FIG. 11A is a view for explaining the position of the first holding portion at time T4 in FIG. 6.

At time T4, the pair of rollers 42 of the first holding portion 4A is in the middle of movement from the second position towards the first position on the guide-plate part 63 of the cam 6, and sandwiches a position substantially in the middle between the second position and first position. The first holding portion 4A having finished welding thereby rotates rearwards from the standing posture towards the loading-enabling position to become the lying posture, as shown in FIG. 11A.

Figure 11B:
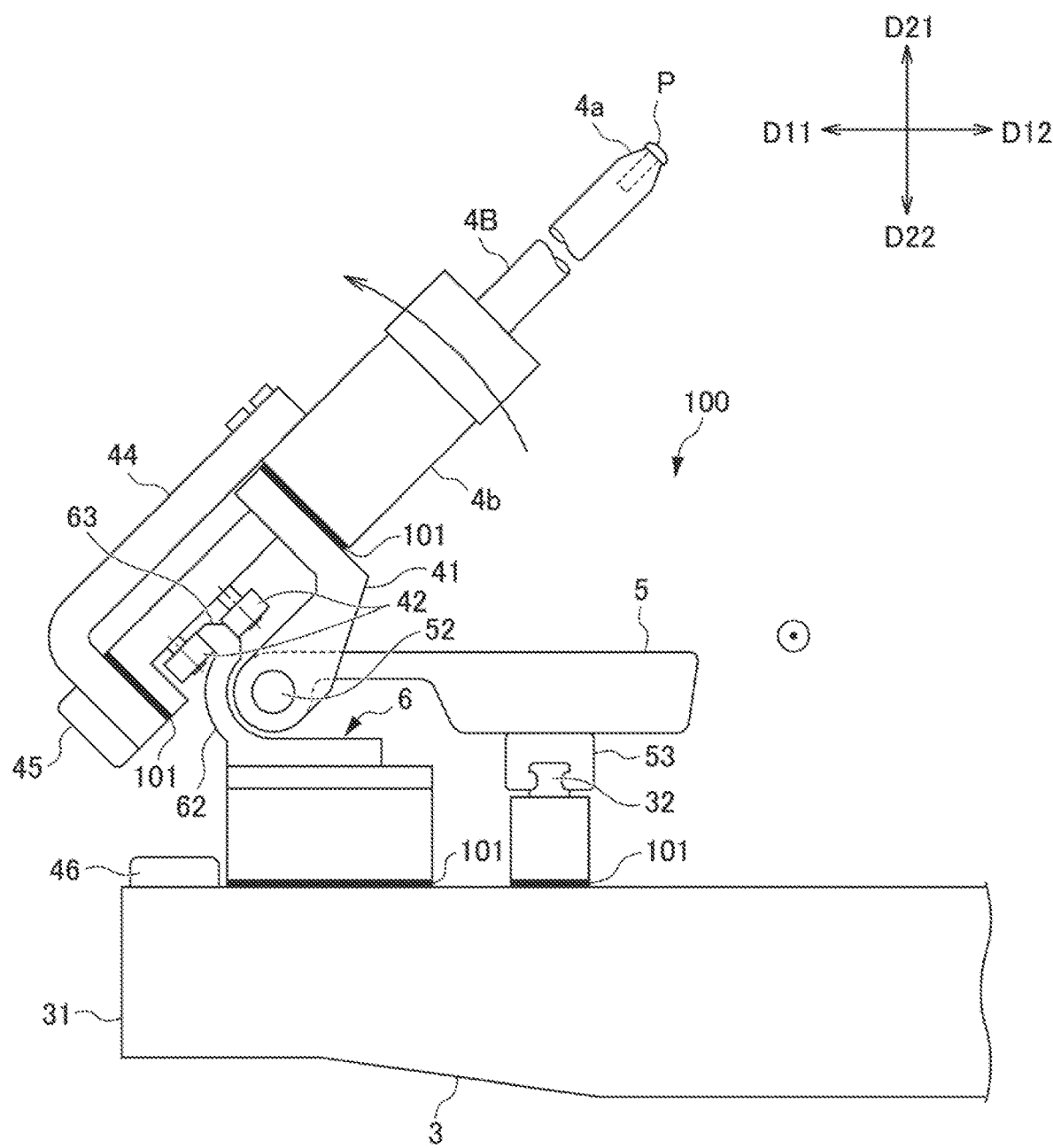
FIG. 11B is a view for explaining the position of the second holding portion at time T4 in FIG. 6.

At the same time T4, the pair of rollers 42 of the second holding portion 4B is in the middle of movement from the first position towards the second position on the guide-plate part 63 of the cam 6, and sandwiches a position substantially in the middle between the first position and second position. The second holding portion 4B holding the component P (second component) thereby rotates forwards from the lying posture towards the abutment-enabling position to become the standing posture, as shown in FIG. 11B.

This second switching step is also performed at a time overlapping the movement step. In other words, the second switching step is executed at a time overlapping the time at which the welding gun 1 moves to the next spot position on the workpiece W. In the present embodiment, the second switching step comes to be executed at a time completely overlapping the time from the start to finish of the movement step.

Next, when the slide arm 5 further moves in the width direction (D32 direction), and the first holding portion 4A and second holding portion 4B move to the position of time T1 again, the robot further executes a welding step. Although not illustrated, in this welding step, a new component P (third component) is supplied from the magazine 7 to the leading end 4a of the first holding portion 4A arranged at the "loading-enabling position", and the component P (second component) at the leading end 4a of the second holding portion 4B arranged at the "abutment-enabling position" is further welded at the next spot position on the workpiece W. Subsequently, by the slide arm 5 slidingly moving similarly in the width direction, the welding gun 1 repeats in order of the second welding step/first loading step to the first switching step to the first welding step/second loading step to the second switching step. Then, accompanying this, the first holding portion 4A and second holding portion 4B repeat reciprocal movement of the position of T1 to the position of T4, and are alternately switched between the "abutment-enabling position" and "loading-enabling position".

In this way, according to the welding gun 1 and the welding method using this, since it is possible to load the component P to any other holding portion 4 while one among the plurality of holding portions 4 is welding the component P to the workpiece W, it is possible to shorten the waiting time until loading completion of the component P, and thus possible to shorten the tact time.

The welding method of the present embodiment configures so that the first loading step and second loading step are performed only during the first welding step and second welding step, respectively; therefore, the loading work of the component P will not be performed during the next movement step. For this reason, it is possible to avoid poor loading of the component P or the like due to a change in acceleration during movement, for example.

In addition, in the welding method of the present embodiment, the first switching step and second switching step are configured to be performed at times overlapping the movement step; therefore, the position of the holding portion 4 is switched during movement of the welding gun 1, and after the movement of the welding gun 1 finished, i.e. after the welding gun 1 has moved to the spot position, will not perform work to switch the position of the holding portion 4. For this reason, it is possible to shorten the waiting time for switching of the position of the holding portion 4, and a further shortening of the tact time is possible.

Furthermore, in the welding method of the present embodiment, this first switching step and second switching step are performed only during the movement step, and are executed at times completely overlapping with the movement step; therefore, switching of the position of the holding portion 4 will not be performed during the welding step or loading step. For this reason, it is possible to avoid poor welding of the component P or poor loading of the component P.

Figure 12:
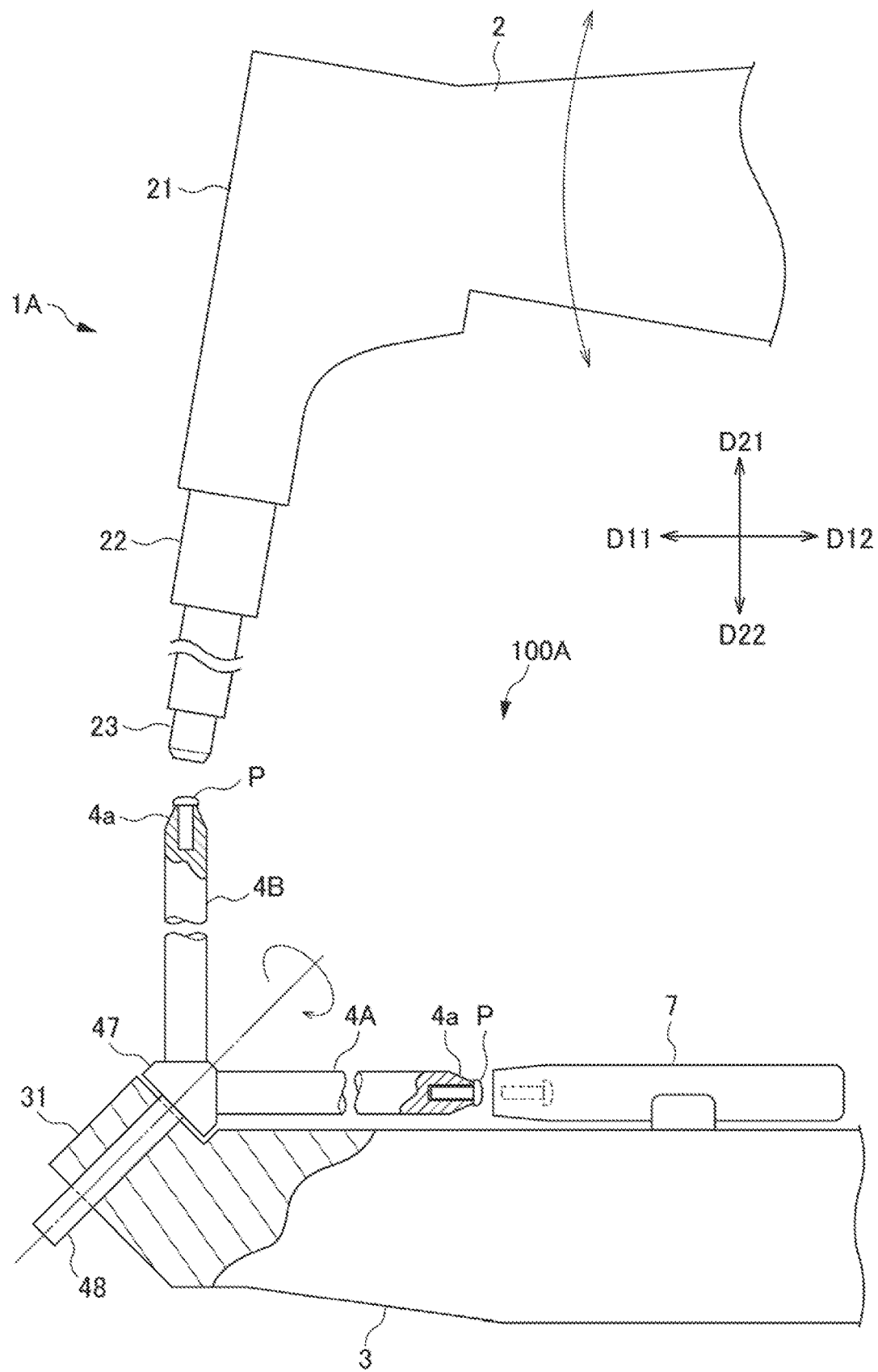
FIG. 12 is a side view showing main parts of another embodiment of a welding gun according to the present invention to be partly fractured.

FIG. 12 is a side view showing main parts of another embodiment of a welding gun according to the present invention to be partly fractured. Since parts with the same reference symbol as the welding gun 1 of the embodiment shown in FIGS. 1 to 5 are parts of the same configuration, detailed explanations thereof cite the above-mentioned explanation, and are omitted herein. In a switching mechanism 100A of a welding gun 1A of the present embodiment, a first holding portion 4A and second holding portion 4B are mounted to a shared base part 47.

The base part 47 is formed in a substantially conical shape, and fixes the first holding portion 4A and second holding portion 4B on the conical surface thereof. The first holding portion 4A and second holding portion 4B are arranged so as to intersect substantially orthogonally at the base part 47, and are fixed so as to project in different directions from each other. In FIG. 12, the first holding portion 4A is arranged at the "loading-enabling position" which is a posture lying down rearwards, and the second holding portion 4B is arranged at the "abutment-enabling position" which is a posture standing upwards.

A shaft 48 of the base part 47 is mounted to be rotatable to the leading end 31 of the fixed arm 3. The shaft 48 is coupled with a drive mechanism that is not illustrated. The base part 47 thereby comes to rotationally drive within a predetermined rotation angle range by the drive mechanism.

Therefore, this welding gun 1A, by rotating the base part 47 in the predetermined rotation angle range, can switch the positions of the first holding portion 4A and second holding portion 4B between the "abutment-enabling position" and "loading-enabling position", similarly to the above-mentioned welding gun 1.

The switching mechanism 100A of this welding gun 1A can switch the position of the first holding portion 4A and the position of the second holding portion 4B by simply providing a rotation mechanism of the shaft 48 of the base part 47; therefore, it is possible to further simplify the configuration of the switching mechanism. As a result thereof, it is possible to make the welding gun lighter weight and more compact.

In the welding guns 1, 1A explained above, the holding portions holding the component also serve as fixed electrode parts; however, the holding portion which holds the component may be configured separately from the fixed electrode part. In this case, upon welding a component, for example, it can be configured so that the holding portion causes the component to move up to the leading end of the fixed electrode part, and sandwich the component between the fixed electrode part and workpiece.

EXPLANATION OF REFERENCE NUMERALS 1, 1A welding gun
3 fixed arm
31 leading end (of fixed arm)
4A first holding portion
4B second holding portion
23 electrode tip
P component
W workpiece

The invention claimed is:

1. A welding gun for resistance welding a component to a workpiece in sequence,
the welding gun comprising:
a mobile arm;
a fixed arm; and
a first holding portion and a second holding portion provided at a leading end of the fixed arm to hold the component,
wherein the first holding portion and the second holding portion are respectively switchable by a switching mechanism between an abutment-enabling position for abutting the component against the workpiece, and a loading-enabling position for receiving loading of the component, the abutment-enabling position is in a posture position standing up relative to the fixed arm, and the loading-enabling position is in a posture position laid down relative to the fixed arm, and
when the first holding portion is in the abutment-enabling position, the second holding portion is in the loading-enabling position, and when the second holding portion is in the abutment-enabling position, the first holding portion is in the loading-enabling position,
the switching mechanism comprises:
two swing arms to which the first holding portion and the second holding portion are respectively fixed, and
a slide arm at which a shaft mounting part of each swing arm is held, the slide arm being arranged on the fixed arm,
a leading end of the slide arm has two holding grooves for sandwiching the each swing arm therebetween, by branching into three in a width direction, the shaft mounting part is mounted by fitting to a shaft extending in the width direction over the holding grooves, and the first holding portion and the second holding portion are respectively switchable between the abutment-enabling position and the loading-enabling position by rotating around the shaft.

2. The welding gun according to claim 1, wherein the first holding portion and the second holding portion both serve as conductive parts which supply electric power to the component.

3. The welding gun according to claim 1, wherein the welding gun performs resistance welding of the workpiece and the component by sandwiching the workpiece by an electrode tip and the component held by the first holding portion and the second holding portion, wherein the electrode tip is supported by the mobile arm of the welding gun to be capable of advancing and retracting relative to each of the first holding portion and the second holding portion provided at the leading end of the fixed arm.

4. A method of resistance welding a component to a workpiece in sequence using a welding gun and a switching mechanism, the welding gun comprising a mobile arm, a fixed arm, and a first holding portion and a second holding portion provided at a leading end of the fixed arm to hold the component, the switching mechanism comprising two swing arms to which the first holding portion and the second holding portion are respectively fixed, and a slide arm at which a shaft mounting part of each swing arm is held, the slide arm being arranged on the fixed arm, a leading end of the slide arm having two holding grooves for sandwiching the each swing arm therebetween, by branching into three in a width direction, the shaft mounting part being mounted by fitting to a shaft extending in the width direction over the holding grooves, and the first holding portion and the second holding portion being respectively switchable between an abutment-enabling position for abutting the component against the workpiece and a loading-enabling position for receiving loading of the component by rotating around the shaft, the loading-enabling position being in a posture position laid down relative to the fixed arm, the method comprising:

a first loading step of loading a first component to the first holding portion;

a first switching step, after the first loading step, the first switching step including an operation of switching the first holding portion to the abutment-enabling position which can abut the first component against the workpiece by way of the first holding portion, and an operation of switching the second holding portion to the loading-enabling position enabling loading of a second component to be welded at a subsequent spot to the second holding portion, the abutment-enabling position is in a posture position standing up relative to the fixed arm;

a first welding step of, after the first switching step, causing the first component to abut the workpiece by way of the first holding portion and welding;

a movement step of, after the first welding step, causing the welding gun to move to a subsequent spot position;

a second loading step of loading the second component to the second holding portion;

a second switching step, after the second loading step, the second switching step including an operation of switching the second holding portion to the abutment-enabling position enabling abutting the second component against the workpiece by way of the second holding portion, and an operation of switching the first holding portion to the loading-enabling position enabling loading of a third component to be welded at a next subsequent spot to the first holding portion; and a second welding step of, after the second switching step, causing the second component loaded to the second holding portion in the second loading step to abut the workpiece by way of the second holding portion and welding, wherein the second loading step is performed at a time overlapping the first welding step.

5. The welding method according to claim 4, wherein the second loading step is only performed during the first welding step.

6. The welding method according to claim 4, wherein the second switching step is performed at a time overlapping the movement step.

7. The welding method according to claim 6, wherein the second switching step is only performed during the movement step.

8. The welding gun according to claim 2, wherein the welding gun performs resistance welding of the workpiece and the component by sandwiching the workpiece by an electrode tip and the component held by the first holding portion and the second holding portion, wherein the electrode tip is supported by the mobile arm of the welding gun to be capable of advancing and retracting relative to each of the first holding portion and the second holding portion provided at the leading end of the fixed arm.

9. The welding method according to claim 5, wherein the second switching step is performed at a time overlapping the movement step.

10. The welding method according to claim 9, wherein the second switching step is only performed during the movement step.

\* \* \* \* \*